United States Patent
Baddepudi et al.

(10) Patent No.: US 10,592,416 B2
(45) Date of Patent: Mar. 17, 2020

(54) WRITE-BACK STORAGE CACHE BASED ON FAST PERSISTENT MEMORY

(75) Inventors: Bharat Chandra Baddepudi, San Jose, CA (US); Juan R. Loaiza, Woodside, CA (US); Wei-Ming Hu, Palo Alto, CA (US); Kothanda Umamageswaran, Sunnyvale, CA (US); Alex Tsukerman, Foster City, CA (US); Boris Erlikhman, Mountain View, CA (US); J. William Lee, Belmont, CA (US); Jia Shi, Burlingame, CA (US); Kiran B. Goyal, Mumbai (IN); Selcuk Aya, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 69 days.

(21) Appl. No.: 13/288,785

(22) Filed: Nov. 3, 2011

(65) Prior Publication Data
US 2013/0086330 A1    Apr. 4, 2013

Related U.S. Application Data

(60) Provisional application No. 61/542,045, filed on Sep. 30, 2011.

(51) Int. Cl.
*G06F 12/08* (2016.01)
*G06F 12/0868* (2016.01)

(52) U.S. Cl.
CPC ......... *G06F 12/0868* (2013.01); *G06F 12/08* (2013.01); *G06F 2212/502* (2013.01)

(58) Field of Classification Search
CPC .................................................. G06F 12/08

USPC ........................................................ 711/143
See application file for complete search history.

(56) References Cited

U.S. PATENT DOCUMENTS

| 4,425,615 A | 1/1984 | Swenson et al. |
| 5,717,893 A | 2/1998 | Mattson |
| 5,774,643 A * | 6/1998 | Lubbers .............. G06F 11/1076 711/114 |
| 5,943,689 A | 8/1999 | Tamer |

(Continued)

FOREIGN PATENT DOCUMENTS

| GB | 2409 301 A | 6/2005 |
| WO | WO 93/18461 | 9/1993 |
| WO | WO 2015/094179 A1 | 6/2015 |

OTHER PUBLICATIONS

U.S. Appl. No. 12/631,985, filed Dec. 7, 2009, Notice of Allowance, dated Jun. 9, 2014.

(Continued)

*Primary Examiner* — Gautam Sain
(74) *Attorney, Agent, or Firm* — Hickman Palermo Becker Bingham LLP (57) ABSTRACT

A storage device uses non-volatile memory devices for caching. The storage device operates in a mode referred to herein as write-back mode. In write-back mode, a storage device responds to a request to write data by persistently writing the data to a cache in a non-volatile memory device and acknowledges to the requestor that the data is written persistently in the storage device. The acknowledgement is sent without necessarily having written the data that was requested to be written to primary storage. Instead, the data is written to primary storage later.

4 Claims, 4 Drawing Sheets

(56) References Cited

U.S. PATENT DOCUMENTS

| | | | |
|---|---|---|---|
| 6,457,105 B1* | 9/2002 | Spencer et al. | 711/136 |
| 6,526,483 B1 | 2/2003 | Cho et al. | |
| 6,683,873 B1 | 1/2004 | Kwok | |
| 6,728,823 B1 | 4/2004 | Walker et al. | |
| 6,823,377 B1 | 11/2004 | Wu | |
| 6,922,754 B2 | 7/2005 | Liu et al. | |
| 7,069,324 B1 | 6/2006 | Tiwana et al. | |
| 7,159,076 B2 | 1/2007 | Madter | |
| 7,165,144 B2 | 1/2007 | Choubal et al. | |
| 7,290,090 B2 | 10/2007 | Madter | |
| 7,461,147 B1 | 12/2008 | Mowat et al. | |
| 7,506,103 B2 | 3/2009 | Madter | |
| 7,636,814 B1* | 12/2009 | Karr et al. | 711/143 |
| 7,660,945 B1 | 2/2010 | Lee | |
| 7,769,802 B2 | 8/2010 | Smith | |
| 7,836,262 B2* | 11/2010 | Gunna et al. | 711/143 |
| 7,904,562 B2 | 3/2011 | Takase et al. | |
| 8,244,984 B1 | 8/2012 | Glasco et al. | |
| 8,327,080 B1* | 12/2012 | Der | 711/143 |
| 8,359,429 B1 | 1/2013 | Sharma et al. | |
| 8,370,452 B2 | 2/2013 | Harvell et al. | |
| 8,683,139 B2 | 3/2014 | Gaither | |
| 9,003,159 B2 | 4/2015 | Deshkar | |
| 9,256,542 B1 | 2/2016 | Flower | |
| 9,703,706 B2 | 7/2017 | Bagal et al. | |
| 2002/0059287 A1 | 5/2002 | Karasudani | |
| 2003/0115324 A1 | 6/2003 | Blumenau | |
| 2004/0054860 A1 | 3/2004 | Dixit | |
| 2004/0117441 A1 | 6/2004 | Liu et al. | |
| 2004/0148486 A1* | 7/2004 | Burton | 711/202 |
| 2004/0225845 A1 | 11/2004 | Kruckemyer et al. | |
| 2004/0230753 A1 | 11/2004 | Amiri | |
| 2004/0254943 A1 | 12/2004 | Malcolm | |
| 2005/0160224 A1 | 7/2005 | Cuomo et al. | |
| 2005/0193160 A1 | 9/2005 | Bhatt et al. | |
| 2005/0210202 A1 | 9/2005 | Choubal et al. | |
| 2006/0064441 A1 | 3/2006 | Yamamoto | |
| 2006/0106890 A1 | 5/2006 | Paul et al. | |
| 2006/0209444 A1 | 9/2006 | Song | |
| 2006/0218123 A1 | 9/2006 | Chowdhuri et al. | |
| 2006/0271605 A1 | 11/2006 | Petruzzo | |
| 2006/0271740 A1 | 11/2006 | Mark | |
| 2007/0006757 A1 | 3/2007 | Morris et al. | |
| 2007/0067575 A1 | 3/2007 | Morris et al. | |
| 2007/0078914 A1 | 4/2007 | Correl | |
| 2007/0260819 A1 | 11/2007 | Gao et al. | |
| 2008/0016283 A1 | 1/2008 | Madter | |
| 2008/0046736 A1 | 2/2008 | Arimilli et al. | |
| 2008/0104329 A1 | 5/2008 | Gaither et al. | |
| 2008/0235479 A1 | 9/2008 | Scales | |
| 2009/0164536 A1 | 6/2009 | Nasre et al. | |
| 2009/0182960 A1 | 7/2009 | Crockett | |
| 2009/0193189 A1* | 7/2009 | Carswell et al. | 711/113 |
| 2009/0240664 A1 | 9/2009 | Dinker et al. | |
| 2009/0248871 A1 | 10/2009 | Takase et al. | |
| 2009/0254521 A1 | 10/2009 | Raman | |
| 2010/0017556 A1 | 1/2010 | Chin et al. | |
| 2010/0070448 A1 | 3/2010 | Omoigui | |
| 2010/0122026 A1* | 5/2010 | Umamageswaran et al. | 711/113 |
| 2010/0158486 A1 | 6/2010 | Moon | |
| 2010/0199042 A1 | 8/2010 | Bates | |
| 2010/0205367 A1 | 8/2010 | Ehrlich | |
| 2010/0274962 A1 | 10/2010 | Moesk | |
| 2011/0022801 A1* | 1/2011 | Flynn | 711/120 |
| 2011/0040861 A1 | 2/2011 | Van der Merwe | |
| 2011/0153719 A1 | 6/2011 | Santoro | |
| 2011/0153941 A1 | 6/2011 | Spatscheck | |
| 2011/0173325 A1* | 7/2011 | Cherian et al. | 709/225 |
| 2011/0191522 A1 | 8/2011 | Condict | |
| 2011/0191543 A1* | 8/2011 | Craske et al. | 711/131 |
| 2011/0238899 A1 | 9/2011 | Yano | |
| 2011/0258376 A1 | 10/2011 | Young | |
| 2011/0320804 A1 | 12/2011 | Chan et al. | |
| 2012/0166729 A1 | 6/2012 | Donley | |
| 2012/0290786 A1 | 11/2012 | Mesnier | |
| 2013/0212332 A1 | 8/2013 | Umamageswaran | |
| 2013/0262697 A1 | 10/2013 | Karasaridis | |
| 2013/0290598 A1 | 10/2013 | Fiske | |
| 2013/0318195 A1 | 11/2013 | Kwapniewski | |
| 2013/0326152 A1 | 12/2013 | Loaiza et al. | |
| 2014/0089565 A1 | 3/2014 | Lee | |
| 2014/0108751 A1 | 4/2014 | Brown et al. | |
| 2014/0149638 A1 | 5/2014 | Jain | |
| 2014/0281167 A1 | 9/2014 | Danilak | |
| 2014/0281272 A1 | 9/2014 | Loaiza et al. | |
| 2015/0006813 A1 | 1/2015 | Goyal et al. | |
| 2015/0012690 A1 | 1/2015 | Bruce | |
| 2015/0019834 A1 | 1/2015 | Loh | |
| 2015/0088822 A1 | 3/2015 | Raja | |
| 2015/0089121 A1 | 3/2015 | Coudhury et al. | |
| 2015/0089138 A1 | 3/2015 | Tao et al. | |
| 2015/0089140 A1 | 3/2015 | Sridharan et al. | |
| 2016/0026579 A1 | 1/2016 | Samanta | |
| 2016/0188414 A1 | 6/2016 | Jayakumar | |
| 2017/0177488 A1 | 6/2017 | Leung | |
| 2019/0132246 A1 | 5/2019 | Kumar | |

OTHER PUBLICATIONS

U.S. Appl. No. 13/485,557, filed May 31, 2012, Office Action, dated Mar. 5, 2014.

U.S. Appl. No. 14/487,358, filed Sep. 16, 2014, Advisory Action, dated Nov. 25, 2015.

Microsoft, "Database Instant File Initialization", SQL Server 2016, https://msdn.microsoft.com/en-us/library/ms175935.aspx, 3 pages.

U.S. Appl. No. 14/336,860, filed Jul. 21, 2014, Office Action, dated Jan. 15, 2016.

U.S. Appl. No. 13/839,251, filed Mar. 15, 2013, Notice of Allowance, dated Feb. 4, 2016.

U.S. Appl. No. 13/839,251, filed Mar. 15, 2013, Advisory Action, dated Jan. 5, 2016.

U.S. Appl. No. 12/691,146, filed Jan. 21, 2010, Office Action, dated Dec. 15, 2015.

U.S. Appl. No. 14/490,367, filed Sep. 18, 2014, Final Office Action, dated Oct. 6, 2016.

U.S. Appl. No. 13/801,319, filed Mar. 13, 2013, Final Office Action, dated Aug. 30, 2016.

U.S. Appl. No. 12/631,985, filed Dec. 7, 2009, Final Office Action, dated Sep. 23, 2013.

U.S. Appl. No. 12/631,985, filed Dec. 7, 2009 Office Action, dated Jan. 14, 2014.

U.S. Appl. No. 14/490,367, filed Sep. 18, 2014, Office Action, dated Mar. 10, 2016.

U.S. Appl. No. 14/487,358, filed Sep. 16, 2014, Notice of Allowance, dated Mar. 29, 2016.

U.S. Appl. No. 13/839,251, filed Mar. 15, 2013, Supplemental Notice of Allowance, dated Feb. 29, 2016.

U.S. Appl. No. 12/691,146, filed Jan. 21, 2010, Interview Summary, dated Mar. 21, 2016.

U.S. Appl. No. 14/336,860, filed Jul. 21, 2014, Notice of Allowance, dated Apr. 27, 2016.

U.S. Appl. No. 12/691,146, filed Jan. 21, 2010, Final Office Action, dated Apr. 20, 2016.

U.S. Appl. No. 12/631,985, filed Dec. 7, 2009, Office Action, dated May 13, 2013.

U.S. Appl. No. 12/691,146, filed Jan. 21, 2010, Examiners Answers, Apr. 29, 2013.

U.S. Appl. No. 14/487,358, filed Sep. 16, 2014, Final Office Action, dated Jun. 16, 2015.

U.S. Appl. No. 13/839,251, filed Mar. 15, 2013, Final Office Action, dated Jun. 10, 2015.

U.S. Appl. No. 13/801,319, filed Mar. 13, 2013, Office Action, dated Jun. 11, 2015.

U.S. Appl. No. 12/691,146, filed Jan. 21, 2010, Office Action, dated Aug. 17, 2012.

U.S. Appl. No. 12/562,984, filed Sep. 18, 2009, Final Office Action, dated Nov. 1, 2012.

(56) References Cited

OTHER PUBLICATIONS

U.S. Appl. No. 14/487,358, filed Sep. 16, 2014, Office Action, dated Feb. 10, 2015.
U.S. Appl. No. 13/839,251, filed Mar. 15, 2013, Office Action, dated Feb. 3, 2015.
U.S. Appl. No. 13/485,557, filed May 31, 2012, Notice of Allowance, dated Feb. 11, 2015.
U.S. Appl. No. 12/691,146, filed Jan. 21, 2010, Examiners Answers, Dec. 1, 2016.
Coudhury, U.S. Appl. No. 14/229,809, filed Mar. 28, 2014, Notice of Allowance, dated Jun. 22, 2017.
Muhkherjee et al., U.S. Appl. No. 15/257,754, filed Sep. 6, 2016, Office Action, dated Nov. 16, 2017.
Muhkherjee, U.S. Appl. No. 15/257,754, filed Sep. 6, 2016, Corrected Notice of Allowance, dated Aug. 28, 2018.
Umamageswaran, U.S. Appl. No. 12/691,146, filed Jan. 21, 2010, Office Action, dated Mar. 13, 2019.
Loaiza, U.S. Appl. No. 13/801,319, filed Mar. 13, 2013, Office Action, dated Jan. 23, 2019.
Umamageswaran, U.S. Appl. No. 12/691,146, filed Jan. 21, 2010, Notice of Allowance, dated May 15, 2019.
Loaiza, U.S. Appl. No. 13/801,319, filed Mar. 13, 2013, Notice of Allowance, dated Mar. 21, 2019.

* cited by examiner

WRITE-BACK STORAGE CACHE BASED ON FAST PERSISTENT MEMORY

CROSS-REFERENCE TO RELATED APPLICATIONS

Benefit Claim

This application claims priority to Provisional Patent Application No. 61/542,045, entitled Write-Back Storage Cache Based On Fast Persistent Memory, filed on Sep. 30, 2011 by Bharat Chandra Baddepudi, et al., the contents of which are incorporated herein by reference.

This application is related to application Ser. No. 12/631,985, Caching Data Between A Database Server And A Storage System, filed by Kiran Badrinarain Goyal, et al., on Dec. 7, 2009, the contents of which are incorporated by reference.

This application is related to application Ser. No. 12/691,146, Selectively Reading Data From Cache And Primary Storage, filed by Kothanda Umamageswaran, et al., on Jan. 21, 2010, the contents of which are incorporated by reference.

FIELD OF THE INVENTION

The present invention relates data storage devices.

BACKGROUND

In computer technology, data is stored in memory devices, from which data may be read and to which data may be written. Memory devices can be volatile or non-volatile. A volatile memory device does not store data after it is powered off, while a non-volatile memory continues to store data after it has been powered off. When the non-volatile memory device is powered back on, the data that stored on the non-volatile memory device while it was powered off can be read.

Examples of a volatile memory device include Volatile Random Access Memory devices (VRAM). Examples of non-volatile memory devices include disk drive devices, flash memory devices, and storage servers, the primary purpose of which is to provide shared access to a set of disk drives or non-volatile memory devices.

Volatile memory devices provide much quicker access but are more expensive, while non-volatile memory devices offer persistence and are less expensive. To provide persistence to a vast body of data and to balance storage costs and quick access, a body of data is primarily stored in non-volatile memory devices and temporary copies of a small portion of the body of data are stored in a volatile memory device, where the copies are accessed very quickly and efficiently. Storage, such as memory in a non-volatile memory device, that is used to hold temporary copies of data stored in a slower form of storage is referred to herein as a cache. The slower form of storage that stores data of which there are temporary copies in a cache is referred to herein as primary storage with respect to the cache.

Often, a cache is a volatile memory device and primary storage is a non-volatile memory device. However, this may not always be the case. A cache and primary storage may both be volatile memory or both may be non-volatile memory. Described herein are approaches to efficiently use a non-volatile cache for non-volatile primary storage in storage device.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described in herein is a storage device that uses non-volatile memory devices for caching. The storage device operates in a mode referred to herein as write-back mode. In write-back mode, a storage device responds to a request to write data by persistently writing the data to a cache in a non-volatile memory device and acknowledges to the requestor that the data is written persistently in the storage device. The acknowledgement is sent without necessarily having written the data that was requested to be written to primary storage. Instead, the data is written to primary storage later.

The operation of persistently writing data to a non-volatile cache and acknowledging to the requester that the data has been persistently written in the storage device without necessarily having written the data to primary storage is referred to herein as a write-back operation.

According to an embodiment, the storage device is also capable of writing in write-through mode. In write-through mode, a storage device responds to a request to write data by persistently writing the data to a primary storage device and then acknowledging to the requester that the data is written persistently in the storage device. The data may then be written to a non-volatile cache.

Illustrative Storage Device

Figure 1:
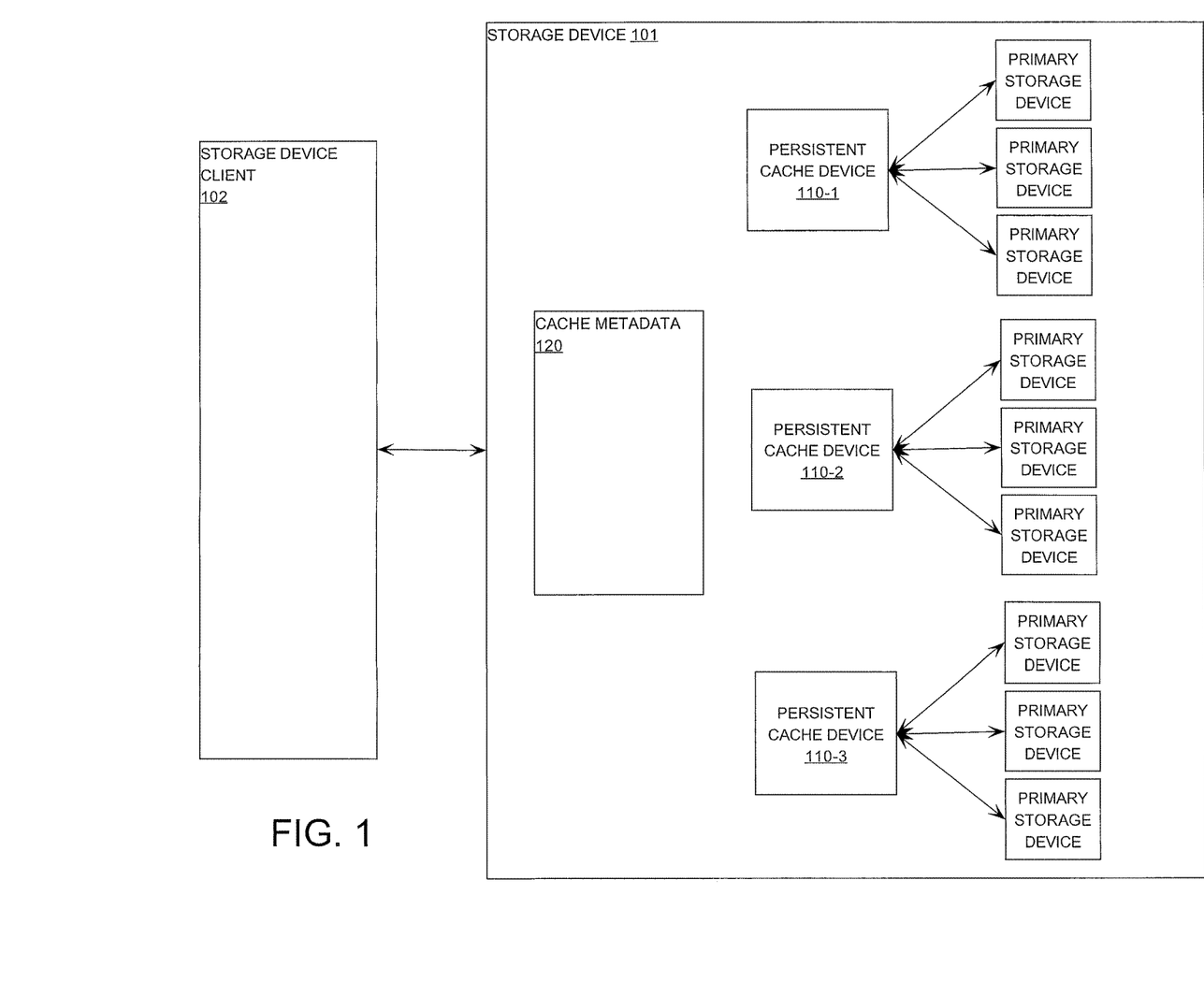
FIG. 1 is a drawing depicting a storage device that uses a persistent cache and primary storage according to an embodiment of the present invention.

Referring to FIG. 1, it depicts storage device 101 comprising persistent cache devices 110, which include persistent cache device 110-1, 110-2, and 110-3. Each of persistent cache devices 110 serves as a cache for a particular set of primary storage devices (not labeled). A persistent cache device 110 and the respective primary storage devices are non-volatile memory devices, a persistent cache device 110 being a faster form of a memory device than the respective primary storage devices but only capable of holding less data.

According to an embodiment, persistent cache device 110 is a flash memory device and the respective primary storage device is a disk drive device. However, this is merely one example of the types of memory devices that may be used to implement a storage device in an embodiment. A persistent cache device may be a smaller higher-speed magnetic disk drive connected to a larger lower-speed magnetic disk device as primary storage device. A persistent cache device may be a smaller higher-speed flash memory device connected to a larger lower-speed flash memory device as primary storage device.

As depicted in FIG. 1, each persistent cache device 110 serves as a cache for three primary storage devices, although the present invention is not limited to any number of primary storage devices to which a persistent cache device serves as a cache, nor must each persistent cache device serve an equal number of primary storage devices.

Storage device client 102 is a client of storage device 101. An example of a storage device client is a database server, including a multi-node database server with each node running an instance of a database server and having shared access to storage device 101. It should be noted that present invention is not limited to database servers as storage device clients, or to any number storage device clients.

According to an embodiment, storage device 101 is a computer system complete with one or more CPUs and volatile memory. The CPU, pursuant execution of software, manages operation of storage device 101.

Storage device 101 is a block mode device. A block mode device provides a client access to data in units referred to as a data block. A data block is the atomic unit of data that a storage device client may request to read from and write to a storage device.

Data in a primary storage device in storage device 101 is also organized by data blocks. A data block is associated with a data block address which uniquely identifies the data block and the data block's storage location within a storage device. A data block's "primary block address" is an address that identifies a storage location of the data block within a primary storage device in storage device 101. A storage device client may request a data block by primary block address, or even by primary block address ranges of data blocks.

Storage in persistent cache device 110 is also organized by data block. Copies of data blocks from a primary storage device are stored in a persistent cache device 110. A copy of a data block in a primary storage device that is stored in a data block of a persistent cache device 110 is referred to herein as a cache copy or a cached data block. At any given moment of operation, the number of cached copies in persistent cache devices 110 is far less than the number of data blocks in persistent cache devices 110.

A cache copy also has a data block address ("cache block address") that identifies a storage location within a persistent cache device that stores the cache copy. Obviously, a cache block address of a data block's cache copy is different than the primary block address of the data block.

In order to manage caching of data blocks between persistent cache devices 110 and the respective primary storage devices, it is important to accurately track what data block a cache copy is a copy of. For this function, storage device 101 stores and manages cache metadata 120. Cache metadata 120 maps a cache block address of a cache copy to the primary block address of the respective data block in a primary storage device.

When a storage device client requests a block mode storage device to write a data block, the client receives a commit acknowledgement acknowledging that the data block has been committed, that is, has been written persistently. Thus, when the data block is next requested by a client, the data block returned should have the version for which a commit acknowledgement was most recently sent.

In write-back mode, storage device 101 writes the data block requested by a client to a persistent cache device and acknowledges the commit of the data block before the data block may be written to the respective primary storage device. The cache copy may then later be written to primary storage device.

Even though the cache copy may be later written to a primary storage device, there is a period of time during which the cache copy is a different and later version of the data block version stored on the respective primary storage device. A cache copy that has been updated in any way before the cache copy is copied to primary storage is referred to herein as dirty. It is important to track that a cache copy is dirty, and cache metadata 120 is used for purposes. Thus, cache metadata 120 not only maps cache copies to data blocks in a primary storage device, but also indicates a cache copy is dirty. A cache copy that has not been modified after being copied from primary storage remains the same as the on primary storage version and is thus referred to as being clean. For any particular cache copy, cache metadata 120 includes a dirty flag that indicates whether or not a cache copy is clean or dirty.

The property of cache metadata 120 to accurately map cache block addresses to primary block addresses and to validly specify dirty cache copies is referred to herein cache metadata coherence. Because storage device 101 may unexpectedly power down and/or fail, it is possible that dirty cache copies remain in a persistent cache device 110. The dirty cache copies may be the latest committed versions of a data block, and it is important to be able to accurately identify and recover the dirty cache copies, so that a valid data block is retained within storage device 101 and returned in response to subsequent client read requests for the data block. For this reason, it is important that cache metadata coherence persist beyond storage device failures.

To persist cache metadata coherence, cache metadata pertaining to the cache data blocks of a persistent cache device is stored in a persistent cache device. As data blocks are written in response to data block write requests from storage device clients, the cache metadata is updated to maintain cache metadata coherence. To update the cache metadata efficiently and ultimately to process data block write requests efficiently, it is desirable to reduce the number of writes to a persistent cache device that are needed to preserve cache metadata coherency. Described herein are techniques for updating persistent cache metadata in a way that reduces the write operations needed.

Illustrative Persistent Cache

Figure 2:
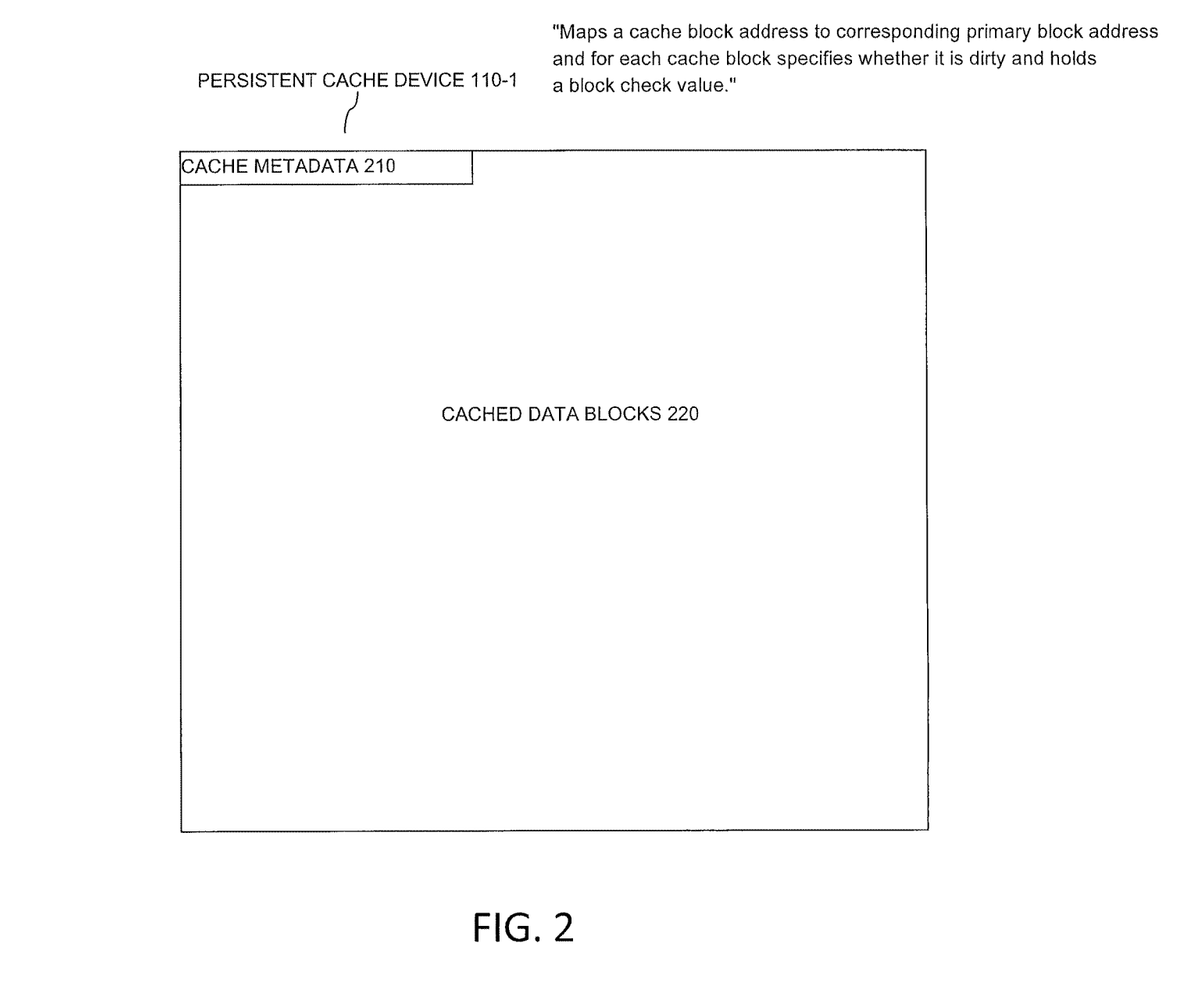
FIG. 2 is a drawing depicting a persistent cache device comprising persistent cache metadata according to an embodiment of the present invention.

FIG. 2 is a diagram that illustrates a persistent cache device that stores cache metadata. Referring to FIG. 2, it shows persistent cache device 110-1. A portion of persistent cache device 110-1 stores cached data blocks 220 and another portion stores cache metadata 210, which is also stored in data blocks. Cache metadata 210 maps a cache block address of a cache copy in cached data blocks 220 to the primary block address of the corresponding data block stored in a primary storage device. For each mapped cached data block, cache metadata includes a dirty flag and a block check value. The block check value is derived from the contents of a data block. A block check value may be a check sum value calculated from the contents of a data block, or may even be just a number of bits from the data block content. Persistent cache metadata for data blocks stored on a persistent cache device may reside on the same persistent cache device, or may reside on a different persistent cache device or non-volatile memory device that is not used to store cache copies. Persistent cache metadata stored on a particular non-volatile memory device may correspond to cache copies stored on multiple non-volatile memory devices.

Illustrative Write-Back Operation

Figure 3:
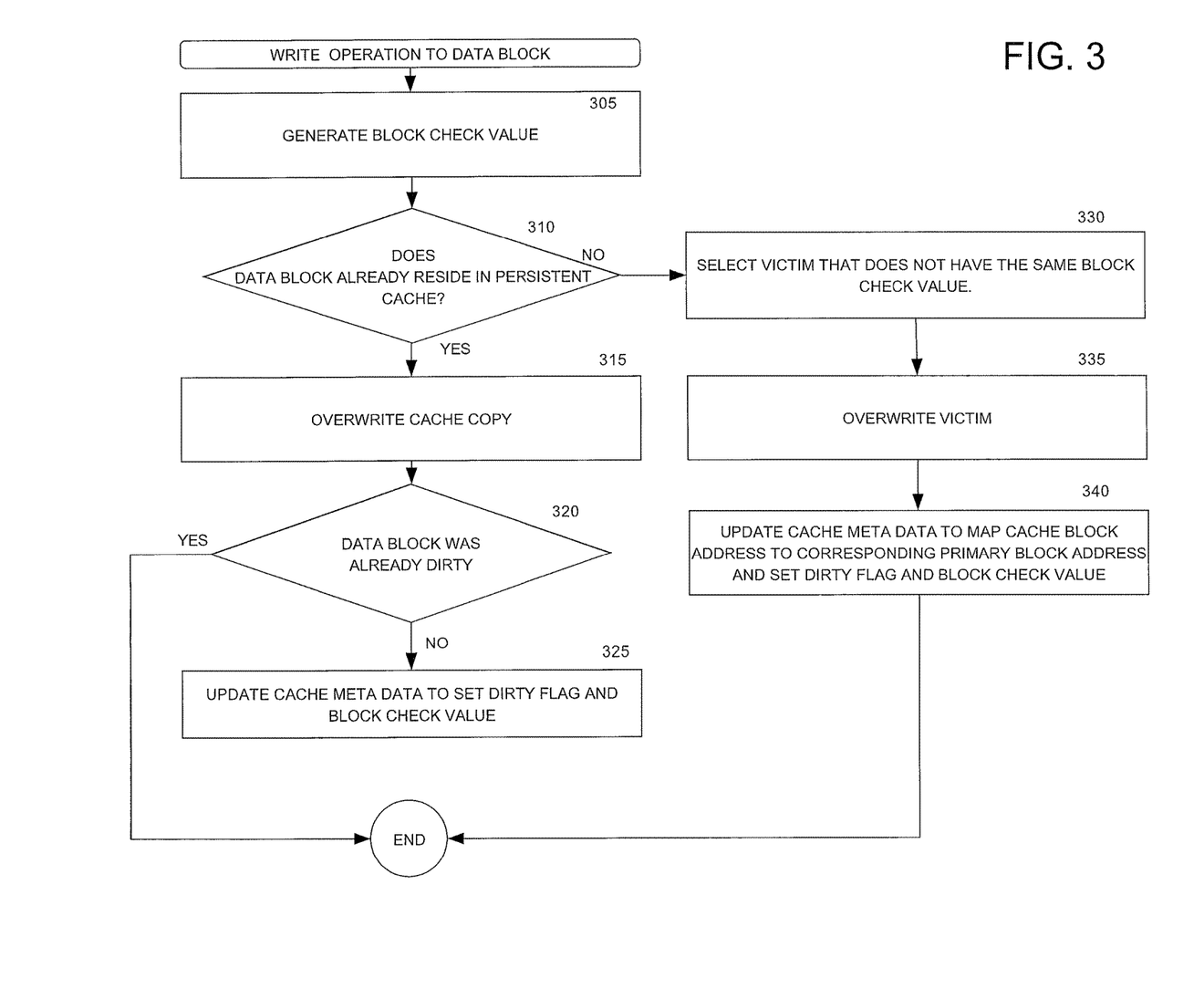
FIG. 3 depicts operations performed during a write-back operation according to an embodiment of the present invention.

FIG. 3 depicts a procedure performed during write-back operations that minimizes updates to cache metadata 210. The operations in the procedure are performed in response to receiving a disk block write request from a storage device client. The request identifies a primary block address of a data block to write, and includes the content of the data block to write, which is referred to herein at data block content. In the below description, the particular operation labeled in FIG. 3 being described is denoted in parenthesis.

Referring to FIG. 3, a block check value is generated for the data block to write. (305) Next, it is determined whether a cache copy of the data block is already in a persistent cache device. (310) The determination is made by determining whether the primary block address is mapped to a cache block address by cache metadata 210.

There may be various reasons for there already being a cache copy of the data block in the persistent cache device. For example, the cache data block may have already have been written to a persistent cache device, in response to a data block write request, and never copied to primary storage and/or never replaced during cache management of the persistent cache. A write-through operation may have written a data block to primary storage and then populated the persistent cache device with the data block. Eventually, a cache copy is written to disk. For example, through execution of a cache management policy, storage device 101 may write a cache copy to a primary storage device for a variety of reasons. When a cache copy is selected as a victim for replacement, the cache copy is written to primary storage. When the cache copy has resided in persistent cache for a threshold period of time, the cache copy may be written to persistent storage.

If a cache copy of a data block is already in a persistent cache device, the cache copy is overwritten with the data block content in the data block write request. (315)

Next, it is determined whether the cache block is already dirty. (320) If the block is already dirty, the procedure ends. This feature of skipping updating of the cache metadata 210 is referred as first-write only updating. Otherwise, the cache metadata is updated to set a dirty flag and the block check value is set to the value calculated at operation 305. (325) As a result, the cache metadata specifies that the cached data block is the latest version between it and the on-primary storage version.

If the determination was that the cache copy of the data block did not already reside in a persistent cache device (330), then a victim cache copy for replacement is selected according to victim selection criteria. According to an embodiment, in write-back mode the victim selection criteria requires the victim to have a block check value that does not match the block check value determined at operation 305 for the data block to write. A victim with a non-matching block check value is selected for reasons that shall be explained later. In addition, the victim should be a clean cache copy, to avoid the need to write a victim to primary storage.

The cache copy to replace is overwritten by the data block content in the data block write request. (335) Next, the cache metadata is updated to map the primary block address of the data block to be written to the respective cache block address, and to set a dirty flag to indicate that the cache block is dirty and the block check value is set to the value calculated at operation 305. (340)

After the procedure ends, a commitment acknowledgement is sent to the storage device client to acknowledge the commitment of the data block write request.

Certain operations in FIG. 3 are not limited to disk block write requests from clients. For example, in response to a data block read request from a storage device client for one or more data blocks, the data block is returned in an acknowledgement message and then the data block is written to a persistent cache device. To write the data block to the persistent cache device, a victim is selected as previously described for write-back mode in operation 330. Then the victim is overwritten and persistent cache metadata updated as similarly described for operations 335 and 340, except that the dirty flag is left set to clean.

How Coherence is Persisted for Recovery

After storage device 101 fails, the data stored therein must be recovered. Recovery entails accurately determining whether cache blocks are dirty versions or valid clean versions. Such a determination requires cache metadata that is coherent after failure. Since failure can occur while a write-back operation is being performed and before it completes, it is important that cache metadata be coherent if when a failure occurs in this situation. The write-back write operation depicted in FIG. 3 updates cache metadata in a way that preserves coherency across failures, when such failures occur while performing the operation, as explained below.

If a failure occurs while performing a write-back operation for a data block that entails overwriting a selected victim, the cache copy victim may be partially overwritten and cache metadata 210 never updated. Cache metadata 210 is left mapping the victim's cache block address to the victim's corresponding primary block address and specifying that the partially overwritten cache copy is clean. However, the block check value of the partially overwritten victim cache block will not match the block check value for the victim stored in the cache metadata.

During recovery, dirty flags that falsely specify that a cache copy is clean can be detected. For a cache copy having a dirty flag specifying the cache copy is clean, the block check value specified in cache metadata 210 for the cache copy is verified by comparing the block check value to the block check value computed from the contents of the cache copy. If the block check values do not match, then the dirty flag falsely specifies that the cache copy is clean.

If instead, the failure occurs after completely overwriting the victim cache copy but before updating cache metadata 210, cache metadata 210 is still left mapping the victim's cache block address to the victim's corresponding primary block address and specifying that a partially overwritten cache copy is clean. Recall that the victim selected for replacement has a non-matching block check value. Thus, the block check value of the fully overwritten cache data block will not match the block check value stored for the victim in the cache metadata.

If a failure occurs while performing a write-back operation for a data block that already has a cache copy in a persistent cache device, the old version of the cache copy may be partially or fully overwritten. Nevertheless, cache metadata 210 already specifies that the cache copy is dirty and correctly maps the cache copy's cache block address to the corresponding primary block address. In fact the cache metadata would not have updated any way.

During recovery, persistent cache metadata is examined to determine which cache data blocks to retain in persistent cache as a cache copy and which are invalid and not to be retained as a cache copy. If the persistent cache metadata specifies that a data block is dirty, then the data block is retained as a cache copy. If the persistent cache metadata specifies that a data block is clean, then the respective block check value specified in persistent cache metadata and the block check value computed from the contents of the data block are compared. If the block check values do not match, then the data block is not retained as a cache copy. According to an embodiment, to speed up recovery, verification of the block check value specified in the cache metadata 210 for a clean data block is not performed during recovery, but is instead performed when such data block is requested by a storage device client. This avoids reading many cache copies during recovery.

Optimizations

The procedure for performing write-operations depicted in FIG. 3 optimizes updates to cache metadata 210 in several ways. During a write-back operation, at most one write is made to a persistent cache device 110 to update cache metadata. Furthermore, the first-time only update feature eliminates further writes to a persistent cache device for write-back operations for an already dirty cache copy.

When storage device 101 is operating in write-back mode, it is not necessary that all disk block write requests be performed as a write-back operation. Rather, only certain categories of disk block write requests need to be performed as a write-back operation. For example, storage device 101 may store database data for a database server. Data block write requests may include data block write requests for user data (e.g. data stored in tables) and data block write request for a log file. The data block write request for user data may be performed in write-back mode while data block write requests for the log file are handled without writing to a persistent cache device 110. This approach frees up the primary storage devices for writing log files.

As mentioned before, cache metadata 210 is stored in data blocks. Write-backs for cache copies may entail updates to cache metadata stored in the same data block in a persistent cache device. When it is determined that write-back operations for cache copies entail updates to the same cache metadata data block, the cache blocks may be overwritten and the updates batched, so that the updates may be made as one update to the same data block. According to an embodiment, to write multiple blocks to a persistent cache device, the victim selection criteria may require victims that have persistent cache metadata in the same data block.

Write-back mode has the advantage of absorbing writes in a persistent cache device rather than a primary storage device. However, a persistent cache device may not be as reliable as a primary storage device. For example, flash memory devices may be more prone to unrecoverable failure than disk drive devices. The dirty and latest versions of data blocks may not be recoverable. Other more time consuming modes of recovery may have to be undertaken.

According to an embodiment, storage device 101 is capable of operating in either write-back mode or write-through mode, and automatically transitioning between the write-back and write-through modes when advantageous to be in one or the other. It may be advantageous to be in write-back mode only when the level of write operations ("write operation load") is above a certain threshold level. For example, when the write operation load is below a certain threshold, relief provided by a persistent cache device absorbing write operations may be minimal, leaving storage device 101 facing the risk of non-recoverable failure with very little or no benefit. However, when the write operation load exceeds a certain threshold, more benefit of write-back mode may be realized. Storage device 101 may monitor the write operation load while in write-through mode. If it is determined that the level has reached a certain threshold while in write-through mode, storage device 101 transitions to write-back mode. If it is determined that the level is below a threshold while in write-back mode, storage device 101 transitions to write-through mode.

To transition from write-back mode to write-through mode, the dirty blocks should be written to the primary storage devices to "clean" the persistent cache devices. In write-through mode, the cache copies in the persistent cache device should be clean because all writes are first committed to primary storage before being propagated to a persistent cache device.

The primary storage devices may not experience the equivalent write operation load for data block write operations. In such situations, a larger portion of persistent cache devices may be allotted to the primary storage devices experiencing heavier load. The load on each primary storage device may be monitored to automatically shift the allotment of persistent cache devices between primary storage devices.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
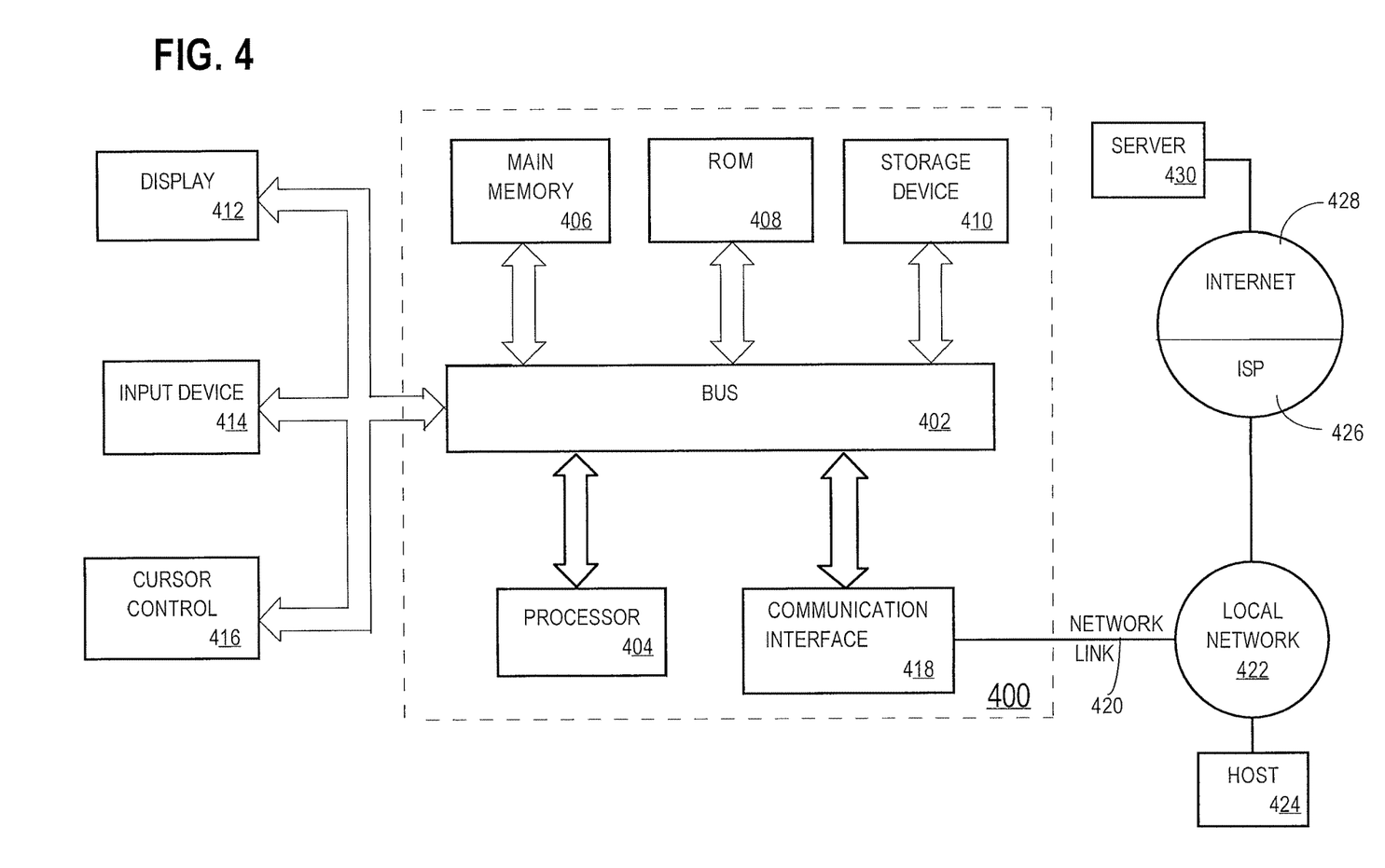
FIG. 4 is a computer system that may be used to implement an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising steps of:
   a storage device receiving from a storage device client a data block write request to write a data block to said storage device;
   wherein said storage device comprises one or more primary storage devices and one or more flash cache devices comprising non-volatile memory;
   selecting a victim cache copy stored in said one or more flash cache devices to which to replace with said data block;
   wherein-persistent cache metadata stored in said one or more flash cache devices:
      maps a cache block address of said victim to a primary block address of the data block of which said victim is a cache copy;
      contains a dirty flag that specifies that said victim is clean;
      associates with said victim a block check value;
   overwriting said victim in said flash cache device with contents of said data block;

encountering a storage device failure before updating said persistent cache metadata to reflect said overwriting of said victim; and said storage device performing recovery, wherein performing recovery includes:

generating a block check value based on content of the data block stored in place of said victim, making a comparison between (1) the block check value generated based on content of the data block stored in place of said victim and (2) the block check value associated with said victim by said persistent cache metadata, and based on the comparison, detecting that the persistent cache metadata contains a false dirty flag that specifies that the data block stored in place of said victim is clean.

2. The method of claim 1, further including:

before said storage device receiving from said storage device client said data block write request:

storing, to a flash cache device of said one or more flash cache devices, a particular data block as a cache copy of a version of said particular data block stored in said one or more primary storage devices, said victim cache copy being said cache copy version of said particular data block;

generating said block check value associated with said victim cache copy;

updating persistent cache metadata stored in said one or more flash cache devices to map said cache copy of said particular data block and to store, in association with said said cache copy of said particular data block, said block check value associated with said victim cache copy.

3. One or more non-transitory storage media storing sequences of instructions, wherein said sequences of instructions, when executed by one or more processors, cause:

a storage device receiving from a storage device client a data block write request to write a data block to said storage device;

wherein said storage device comprises one or more primary storage devices and one or more flash cache devices comprising non-volatile memory;

selecting a victim cache copy stored in said one or more flash cache devices to which to replace with said data block;

wherein-persistent cache metadata stored in said one or more flash cache devices:

maps a cache block address of said victim to a primary block address of the data block of which said victim is a cache copy;

contains a dirty flag that specifies that said victim is clean;

associates with said victim a block check value;

overwriting said victim in said flash cache device with contents of said data block;

encountering a storage device failure before updating said persistent cache metadata to reflect said overwriting of said victim; and said storage device performing recovery, wherein performing recovery includes:

generating a block check value based on content of the data block stored in place of said victim, making a comparison between (1) the block check value generated based on content of the data block stored in place of said victim and (2) the block check value associated with said victim by said persistent cache metadata, and based on the comparison, detecting that the persistent cache metadata contains a false dirty flag that specifies that the data block stored in place of said victim is clean.

4. The one or more non-transitory storage media of claim 3, the sequences of instructions further including instructions that, when executed by said one or more processors, cause:

before said storage device receiving from said storage device client said data block write request:

storing, to a flash cache device of said one or more flash cache devices, a particular data block as a cache copy of a version of said particular data block stored in said one or more primary storage devices, said victim cache copy being said cache copy version of said particular data block;

generating said block check value associated with said victim cache copy;

updating persistent cache metadata stored in said one or more flash cache devices to map said cache copy of said particular data block and to store, in association with said said cache copy of said particular data block, said block check value associated with said victim cache copy.

* * * * *

UNITED STATES PATENT AND TRADEMARK OFFICE
CERTIFICATE OF CORRECTION

PATENT NO. : 10,592,416 B2
APPLICATION NO. : 13/288785
DATED : March 17, 2020
INVENTOR(S) : Baddepudi et al.

Page 1 of 1

It is certified that error appears in the above-identified patent and that said Letters Patent is hereby corrected as shown below:

In the Claims

In Column 11, Line 32, in Claim 2, delete "said said" and insert -- said --, therefor.

In Column 12, Line 43, in Claim 4, delete "said said" and insert -- said --, therefor.

Signed and Sealed this
Twenty-seventh Day of October, 2020

Andrei Iancu
*Director of the United States Patent and Trademark Office*